United States Patent
Vestner et al.

[11] Patent Number: 6,107,591
[45] Date of Patent: Aug. 22, 2000

[54] GAS-INSULATED HIGH-VOLTAGE COMPONENT WITH TRANSPORT SUPPORT

[75] Inventors: Markus Vestner, Büsingen; Andreas Nohl, Zürich, both of Switzerland

[73] Assignee: Asea Brown Boveri AG, Baden, Switzerland

[21] Appl. No.: 09/390,675

[22] Filed: Sep. 7, 1999

[30] Foreign Application Priority Data

Sep. 9, 1998 [DE] Germany .......................... 198 41 175

[51] Int. Cl.[7] .......................... H01H 33/02; H02B 13/00
[52] U.S. Cl. .................. 218/43; 174/10; 218/68
[58] Field of Search .......... 218/43, 68; 174/10; 361/604, 612, 618; 29/592

[56] References Cited

U.S. PATENT DOCUMENTS

| | | | |
|---|---|---|---|
| 3,875,466 | 4/1975 | Jakszt | 361/120 |
| 4,096,628 | 6/1978 | Backskog | 29/628 |

FOREIGN PATENT DOCUMENTS

| | | |
|---|---|---|
| 2211463 | 9/1972 | Germany . |
| 19604342A1 | 11/1996 | Germany . |

Primary Examiner—J. R. Scott
Attorney, Agent, or Firm—Burns, Doane, Swecker & Mathis, L.L.P.

[57] ABSTRACT

A gas-insulated power breaker (1) has encapsulation (2) which is filled with an inert gas. Live parts (10, 11, 12, 13) are arranged in the encapsulation (2). In order to prevent damage to the live parts (10, 11, 12, 13) during transportation, a transport support (17) is provided. In a secured position, the transport support (17) supports the live parts (10, 11, 12, 13) with respect to the encapsulation (2). It can be partially withdrawn and moved to an operating position, through a gastight aperture (22), without the inert gas having to be evacuated or the encapsulation (2) opened in this event. This allows the switch to be transported safely, prevents contamination of the interior (3) of the encapsulation (2), and avoids the need for costly emptying and refilling with inert gas.

10 Claims, 2 Drawing Sheets

GAS-INSULATED HIGH-VOLTAGE COMPONENT WITH TRANSPORT SUPPORT

BACKGROUND OF THE INVENTION

1. Field of the Invention

The invention relates to a gas-insulated high-voltage component.

2. Discussion of Background

Gas-insulated components of this type are, for example, power breakers for high voltages. They have housing to accommodate the live parts. The housing is gastight, and is filled with an inert gas at a defined pressure.

The live parts of such systems are mechanically relatively sensitive, thus causing difficulties during transportation. In order to avoid transport damage, the housing can be opened so that the live parts can be removed or reinforced. However, the gas must be allowed to escape to do this. In the process, contamination can occur. Thus, after such an action, the system must be carefully tested again.

SUMMARY OF THE INVENTION

Accordingly, the object of the invention is to provide a novel gas-insulated high-voltage component of the type mentioned therefor, which can be transported easily.

According to the invention, the component is thus equipped with a transport support, by which the live parts can be supported with respect to the housing. Thanks to this transport support, the live parts can withstand relatively high accelerations. Since operating means, which are at the same time gastight, are provided in order to release the live parts, the transport support can be detached without the inert gas having to be evacuated or the housing opened. Undesirable contamination of the housing interior can thus be avoided.

A gastight bushing is preferably provided on the housing through which the transport security device can be withdrawn. The transport support may thus, for example, have a neck in the form of a rod, which extends through the bushing such that it can be moved, and can thus be operated from the outside. A head can be arranged on this neck and can be connected, for example screwed, to the live parts of the component.

When the transport support is in a withdrawn position, the neck can preferably be taken off the head, so that it does not project beyond the housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
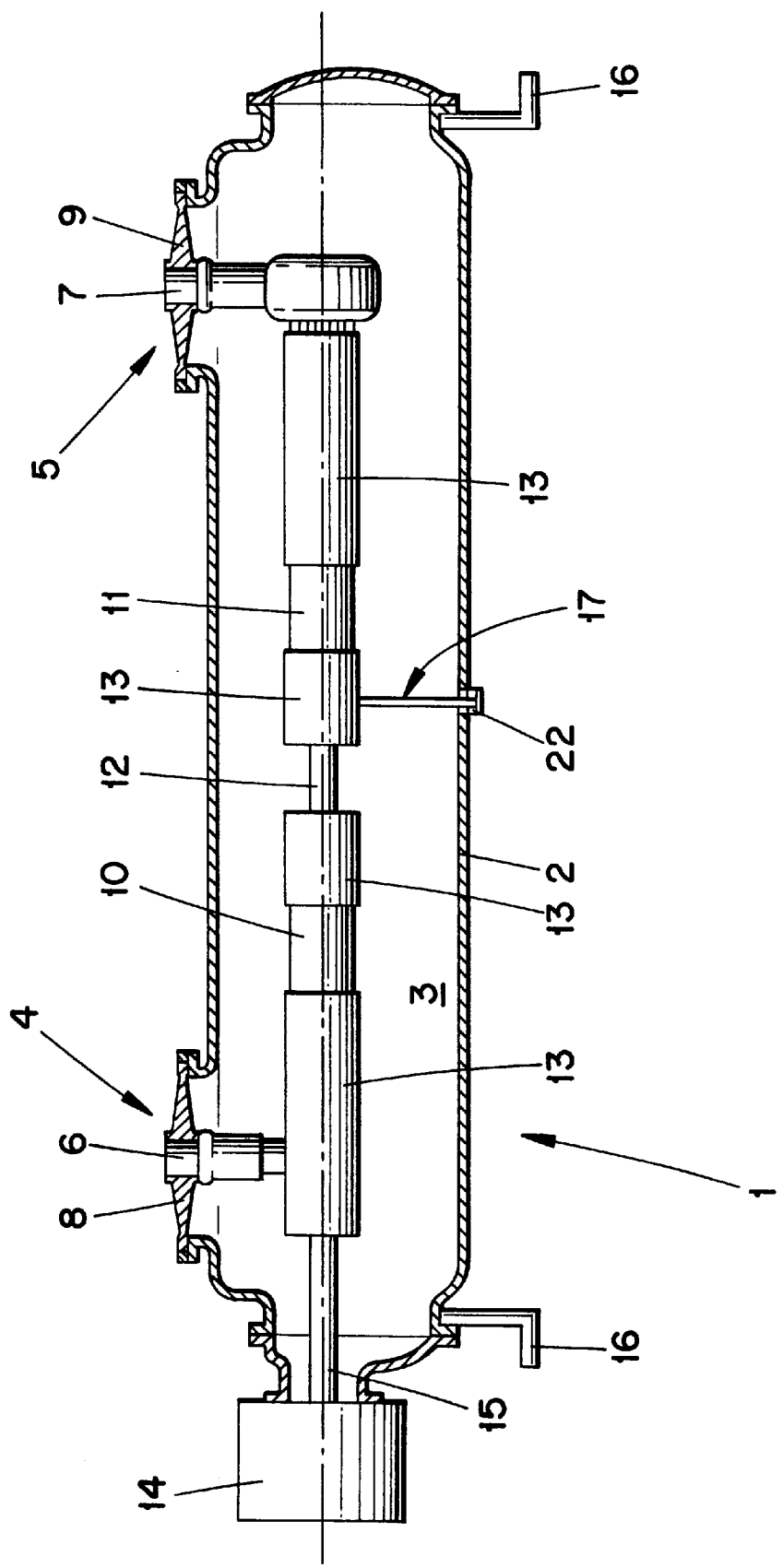
FIG. 1 shows a section through a power breaker according to the invention.

Referring now to the drawings, wherein like reference numerals designate identical or corresponding parts throughout the several views, FIG. 1 shows a longitudinal section through a gas-insulated power breaker 1. This has an essentially cylindrical housing 2, whose interior 3 is filled with an inert gas at a predetermined pressure. It has two connections 4, 5, whose electrodes 6, 7 are held by supporting insulators 8, 9. Two arc-quenching chambers 10, 11 are located between the electrodes and are connected via a connecting piece 12. The arc-quenching chambers 10, 11 are surrounded by shields 13. The actual switching elements for interrupting the electrical circuit are located in the arc-quenching chambers. The switching elements are operated by a drive 14, via an operating rod 15. The power breaker rests on feet 16.

The live parts of the power breaker 1, in particular the arc-quenching chambers 10, 11, the connecting piece 12 and all the shields 13, are mechanically sensitive. A transport support 17 is therefore provided for transportation of the power breaker, and supports the live parts with respect to the housing 2.

Figure 2:
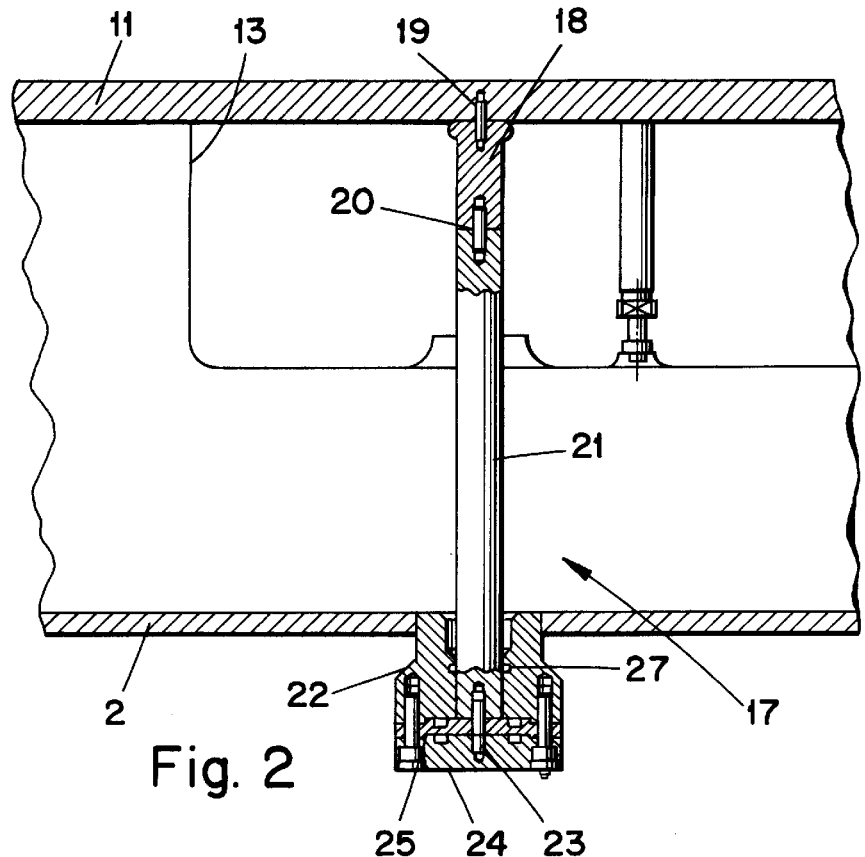
FIG. 2 shows a detail view from FIG. 1 with the transport support in the secured position.
Figure 3:
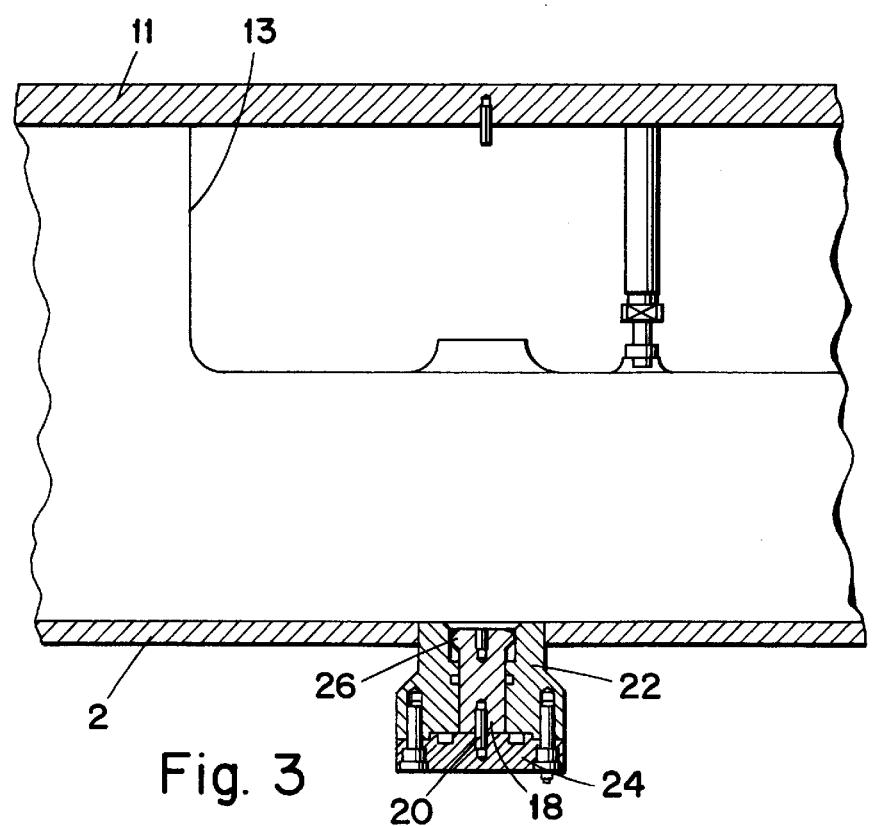
FIG. 3 shows the detail view shown in FIG. 2, with the transport support in the withdrawn position.

The construction of the transport support 17 can be seen in FIGS. 2 and 3, with FIG. 2 showing the transport support in the secured position, and FIG. 3 showing it in the withdrawn position.

In the secured position, the transport support 17 extends from the housing 2, through an opening in the shield 13, as far as the arc-quenching chamber 11. In the present configuration, it has a metallic head 18 which is screwed via a first threaded pin 19 to the arc-quenching chamber 11. At its outer end, the head 18 is connected via a second threaded pin 20 to a neck 21 in the form of a rod. The neck 21 extends through a bushing 22, which is arranged on the housing 2. The bushing 22 is provided with seals 27, and is gastight. The outer end of the neck 21 is connected via a third threaded pin 23 to a cover 24, which is firmly screwed to the bushing 22. An intermediate plate 25 is arranged between the cover 24 and the bushing 22, but its function will not be discussed in more detail below.

In the secured position shown in FIG. 2, the transport support 17 forms a mechanical connection between the housing 2 and the live parts which protects the live parts from tension and impacts. While preventing damage to the power breaker during transportation. Since the transport support is gastight, it allows the power breaker to be transported without the inert gas being let out.

In order to release the transport support 17 and to move it to the withdrawn position shown in FIG. 3, the cover 24 is unscrewed. The head 18 is unscrewed from the threaded pin 19 by rotating the transport support. The transport support can then be pulled out. The seal 27 in this case ensures that no inert gas can escape. The transport support 17 is pulled out until the head 18 is located in the position shown in FIG. 3. In this position, a bead 26 at the inner end of the head 18 prevents the head from sliding completely out of the bushing 22.

The neck 21 is now unscrewed from the head 18, with the third threaded pin 23. The neck 21 is not required in the withdrawn position, and can be removed. The intermediate plate 25 is also removed. The threaded pin 20 is used in order to connect the head 18 directly to the cover 24. The cover is then screwed to the bushing 22 again.

In the withdrawn position shown in FIG. 3, the head 18 has been completely pulled back into the wall of the housing 2 and does not project into its interior, thus avoiding dielectric overstressing in operation.

The absence of the intermediate plate 25 indicates to the personnel that the transport support 17 is located in the withdrawn position.

There is no need to evacuate the power breaker (which can remain within the inert gas since the operating process is carried through the gastight bushing 22) in order to move the transport support 17 from the secured position to the withdrawn position, or else to move it from the withdrawn position to the secured position. This has the advantage that the power breaker can be tested at the manufacturer's works, can then be transported to the installation site and can be installed there without the inert gas having to be removed or the housing having to be opened. This allows contamination of the interior 3 of the power breaker to be prevented, and there is no need for costly emptying and filling.

In the embodiment shown, the transport support 17 is connected to one of the arc-quenching chambers in the secured position. However, it is also conceivable for the transport support 17 to be attached to one of the other live parts 10, 12 or 13.

In one embodiment of the transport support 17 which is resistant to tension and impacts, the neck 21 is produced from a plastic, while the threaded pin 20 is produced from a metal. This refinement of the materials has the advantage that no metal swarf can be produced during removal of the transport support 17, which could result in dielectric problems in the interior of the housing 2.

In this case, the threaded pin 19 is screwed to the arc-quenching chamber 11 by means of a right-hand thread, with this screw connection being secured against becoming loose, for example by means of an adhesive. The threaded pin 20 is in this case screwed into the head 18 by means of a left-hand thread, with this screw connection likewise being secured against becoming loose, for example by means of an adhesive. The threaded pin 23 is screwed to the cover 24 by means of a right-hand thread, once again with this screw connection being secured against becoming loose, for example by means of an adhesive.

The transport support can also be provided without the threaded pin 19, or can be connected to the live parts by means of a snap-action connection or a bayonet fitting.

It is also conceivable to use the transport support for gas-insulated high-voltage components other than a power breaker, for example for busbars with relatively long physical lengths.

Obviously, numerous modifications and variations of the present invention are possible in light of the above teachings. It is therefore to be understood that, within the scope of the appended claims, the invention may be practiced otherwise than as specifically described herein.

What is claimed is:

1. A gas-insulated high-voltage component, comprising: live parts disposed within a gas-filled housing; at least one transport support for supporting the live parts with respect to the housing such that said live parts are resistant to tension and impacts; and wherein the transport support can be fitted and removed from the housing via an operating device which is gastight.

2. The high-voltage component as claimed in claim 1, wherein the operating means comprise a gastight bushing on the housing.

3. The high-voltage component as claimed in claim 2, wherein the transport support has a rod-like neck which extends through the bushing such that it can be moved.

4. The high-voltage component as claimed in claim 3, wherein the rod-like neck of the transport support is produced from a plastic.

5. The high-voltage component as claimed in claim 3, wherein a head is arranged on the neck and has attachment means for producing a force-transmitting connection to the live parts.

6. The high-voltage component as claimed in claim 5, wherein the attachment means can be screwed to the live parts or can be snapped onto the live parts.

7. The high-voltage component as claimed in claim 5, wherein the neck can be removed from the head and can be removed from the high-voltage component when the transport support is in a withdrawn position.

8. The high-voltage component as claimed in claim 3, wherein the transport support has restraining means which prevent complete withdrawal of the transport support through the bushing.

9. The high-voltage component as claimed in claim 1, wherein the transport support can be moved backward and forward by the operating means between a secured position and an operating position, with the live parts being supported in the secured position and an inner side of the housing not projecting inward in the operating position.

10. A gas-insulated high voltage component, comprising:

a housing;

live parts disposed within said housing;

a transport support for supporting said live parts, said transport support having a first secured position wherein said live parts are supported by said transport support and a second withdrawn position wherein said live parts are not supported by said transport support; and a gastight operating device for allowing entry and removal of said transport support from said housing while maintaining said component gastight.

* * * * *